United States Patent

[11] 3,550,882

| [72] | Inventors | Jack L. Craven<br>Anaheim;<br>Ernest B. Marjoram, West Covina, Calif. |
|---|---|---|
| [21] | Appl. No. | 784,658 |
| [22] | Filed | Dec. 18, 1968 |
| [45] | Patented | Dec. 29, 1970 |
| [73] | Assignee | Electro-Photo Corporation<br>Fullerton, Calif.<br>a corporation of California |

[54] SELF-THREADING CAMERA CASSETTE
10 Claims, 10 Drawing Figs.

[52] U.S. Cl. .......................................... 242/197, 352/78
[51] Int. Cl. ........................................ G03b 1/04, G11b 15/32, G11b 23/04
[50] Field of Search ........................................ 242/71—71.2, 197—200; 352/72—78; 95/31

[56] References Cited
UNITED STATES PATENTS

| 1,825,142 | 9/1931 | Bruno............................ | 242/197X |
| 2,298,339 | 10/1942 | Boes.............................. | 242/197 |
| 3,075,427 | 1/1963 | Salzmann..................... | 242/198X |
| 3,186,321 | 6/1965 | Kimrey et al. ................ | 95/31 |

Primary Examiner—Leonard D. Christian
Attorney—Lynn H. Latta

ABSTRACT: An exposed film camera cassette having a guide which becomes operable, upon opening of the cassette, to guide the forward end of a film strip from a feed sprocket into the cassette and into tangent contact with the cassette's winding arbor, in position to be coupled onto the arbor as the latter is rotated in a winding operation.

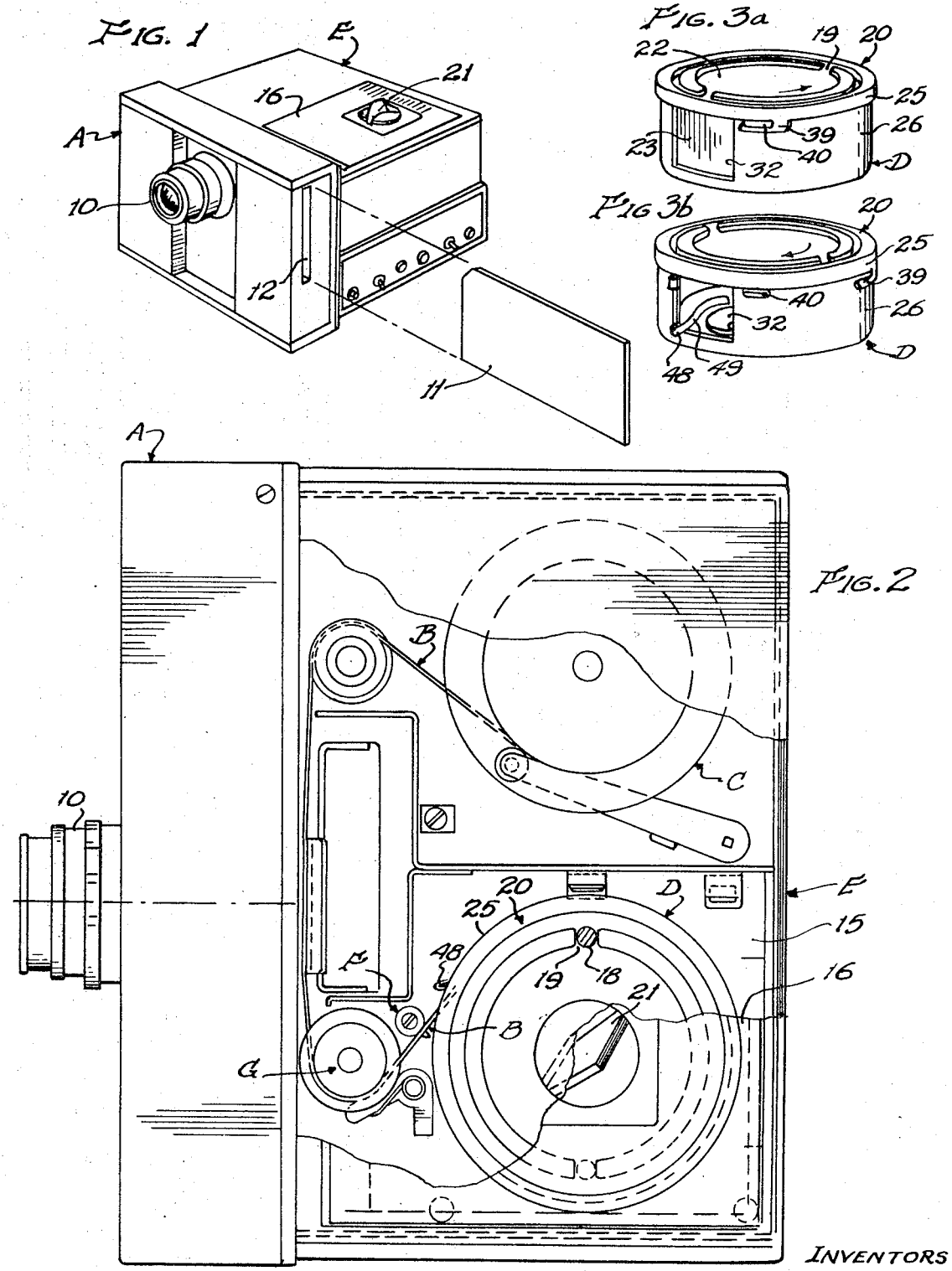

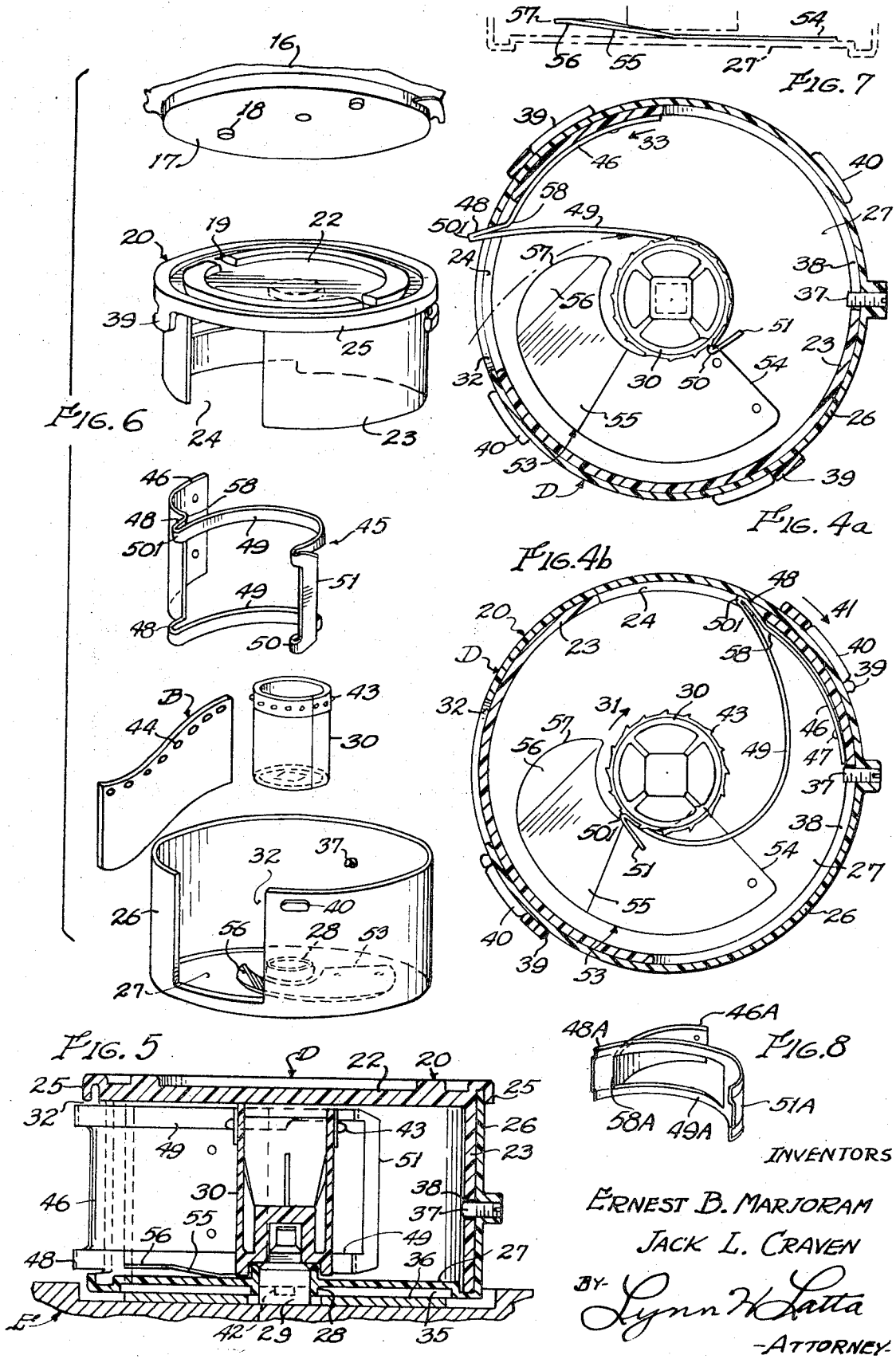

SELF-THREADING CAMERA CASSETTE

BACKGROUND OF THE INVENTION

A commercial camera, suitable for taking a series of portrait photos for identification cards, student yearbook pictures, etc., having a cassette for receiving and reeling a quantity of exposed film taken by a photographer during a day's work, having a knife adjacent its film-receiving door, for severing the quantity of film within the cassette from the supply of film remaining in the camera, and having a rotatable gate for closing the cassette for removal from the camera to a dark room for development of the exposed film, is disclosed in Craven U.S. Pat. No. 3,223,007 issued Dec. 14, 1965. All such cameras have hitherto been subject to the problem of how to thread the severed end of the film remaining in the camera, into the cassette and to attach it to the winding arbor without difficulty. The most satisfactory (but not fully satisfactory) solution of this problem heretofore has been a reel composed of a flat metal disc on one side and a conical soft rubber disc on the other side, the convex side of the conical disc being opposed to the flat disc inside the reel, so as to engage the film as it is guided into the reel by a straight flexible guide strip. The inwardly protruding yieldable cone engages the edge of the film strip and drags it circumferentially in the direction of rotation, and inwardly to the winding arbor, the cone flattening out as the film is wedged between it and the opposed rigid flat disc. While this device opposes any tendency of the entering end of the film to wander to the wrong side of the arbor (which could easily happen if there were no circumferential push exerted against the free end of the film upon entering the reel) the device does not provide a positive guidance of the film in a direct path inwardly to a point of tangent, coupling engagement with the winding arbor.

The problem of self-threading of film into a takeup reel is compounded where the reel is a cassette having a cylindrical peripheral wall with a door through which the film must be threaded. The free end of the film must be guided so as to avoid missing the door and sliding externally along the peripheral wall. It must enter the cassette tangentially on the side of the winding arbor which is receding from the approaching film, so that the sprocket teeth of the arbor may pick up the sprocket apertures of the film. It must make contact with such receding side and not pass between the arbor and the opposed internal area of the peripheral wall of the cassette, missing the arbor. Attempts to control the free end of the film as it is fed toward the cassette, have been beset by many difficulties in the past.

OBJECTS OF THE INVENTION

The general object of the invention is to provide a thoroughly reliable means for self-threading of a free end of film into a cassette and into coupling engagement with the winding arbor thereof. More specific objects are:

1. to provide a threading guide adapted to guide a free end of film from a door in the side of a cassette to a position of tangent contact with the receding side of a rotating winding arbor, with positive guiding contact with the film up to said position of contact;

2. to provide such a guide which is contained within the cassette when the cassette is closed;

3. to provide such a guide which is operable to intercept and lead into the cassette through such door, a free end of film coming from a feed sprocket externally of the cassette;

4. to provide such a guide which includes a gathering finger or fingers automatically projected through the cassette door to film-gathering position in response to opening of the cassette, and retracted into the cassette in response to closing of the cassette;

5. to provide for radially outward yielding of the inner end of the guide in response to expanding diameter of the wound-up body of film on the arbor; and 6. to provide a second guide that prevents the film from passing between the arbor and the opposed internal area of the peripheral wall of the cassette during the moments prior to engagement of film to arbor and then to have this guide member moved laterally out of the way by the action of the film attaching itself to the arbor.

These and other objects will become apparent in the ensuing specifications and appended drawings, wherein:

FIG. 1 is a perspective view of a camera of the type in which the invention may be embodied;

FIG. 2 is a top plan view of the same, with parts broken away to disclose the cassette of our invention and other associated interior parts;

FIG. 3a is a perspective view of the cassette in closed condition;

FIG. 3b is a perspective view of the same in open condition;

FIG. 4a is a horizontal sectional view of the cassette in open condition;

FIG. 4b is a horizontal sectional view of the same, in closed condition;

FIG. 5 is an axial sectional view of the cassette in the open condition;

FIG. 6 is an exploded perspective view of the cassette;

FIG. 7 is a detail of the bottom guide tongue; and

FIG. 8 is a perspective view of a modified form of guide which can be utilized by the invention.

DESCRIPTION

Background Features—the Camera

Referring now to the drawings in detail, and in particular to FIGS. 1—3b, I have shown therein, as an example of one form in which the invention may be embodied, a camera of a type widely employed for recording, on a strip of film, a series of portrait images in a partial area of a background image of an identification card or for taking a series of portraits of students, etc. for school yearbooks or the like. Such a camera commonly embodies a housing having a head A defining an exposure chamber in which the subject's portrait image, received through a lens 10, is superimposed upon a background image, taken from an indicia plate 11 inserted into a slot 12 in head A, to provide a composite image which is recorded on a strip of film B travelling from a supply reel C to a takeup reel D (the cassette of the invention) the two reels being normally contained within respective compartments of light-excluding housing E at the back of head A. A film-severing knife F of a guillotine type, is mounted adjacent the film-receiving door of cassette D, between the cassette and a feed sprocket G which draws the film from the supply reel C across the path of the image-bearing light beam, and feeds it into the cassette D past knife F. A suitable drive mechanism (not shown) drives the feed sprocket G and cassette D in unison, the drive to cassette D being of a slipping type always attempting to draw the film into the cassette faster than it is fed by sprocket G, so that no slack can develop in the stretch of film entering the cassette. This drive relationship is made use of by the invention in coupling the free end of the film entering the cassette at startup, to the cassette's winding arbor which, when not restrained by attached film, will rotate ahead of the entering film, its sprocket teeth having a circumferential movement faster than the linear movement of the approaching free end of the film, so that the teeth will mesh with the film as soon as the teeth and apertures register after initial contact of the film with the arbor.

Such a camera is disclosed in the above-mentioned Craven et al. U.S. Pat. No. 3,223,007, and is well known in the art. Hence its construction is illustrated herein only to the extent necessary to understand the operational relationship of the film-guiding mechanism of this invention to the parts of the existing camera which cooperate therewith in feeding into the cassette the free end of the film left in the camera when the exposed film wound into the cassette is severed by knife F. To those familiar with this type of camera, it will be understood that at the end of a session of shooting a succession of exposures on the film, it is customary to open the cassette compartment 15 of camera housing E, which closes the cassette; to then sever the exposed film; to remove the cassette, take it into a dark room, remove and develop the exposed film; to replace the cassette in the camera, to thread the free end of the film remaining in the camera into the cassette and attach it to the winding arbor of the cassette; and then to close the camera for further use. If no automatic means for inserting the film into the cassette and attaching it to the arbor is provided in the camera, the threading operation must be executed manually, and since it is normally a difficult operation, it requires training in order to achieve it satisfactorily. The present invention renders the threading operation automatic so as to save time, reduce the level of training and skill required in the camera operation; and avoid film wastage resulting from improper handling by an inexperienced operator. The invention eliminates the necessity for leaving the camera open while rethreading the film into the empty cassette, making it possible to immediately close the camera after replacing the empty cassette therein.

With continuing reference to the general camera structure the cassette compartment 15 of housing E is normally closed and light sealed by a cover 16 which can be removed or lifted (e.g. on a hinge not shown) so as to open the compartment. On the underside of cover 16, immediately above and in coaxial relation to cassette D when the cover is closed, is a rotatable actuator disc 17 (FIG. 6) having clutch dogs 18.

The Cassette—in General

When the cassette D is assembled in the camera, dogs 18 project downwardly into clutching engagement in clutch recesses 19 in a rotatable gate section 20 of cassette D, for opening and closing the cassette by operation of an external knob 21 connected to actuator disc 17 by a stem (not shown) extending through cover 16. Gate section 20 includes an imperforate top disc 22, a cylindrical skirt 23 having a door 24, and a light-sealing annular lip 25 of channel section which fits over the top rim of a cylindrical lateral wall 26 of the cassette casing which also includes a circular disc bottom 27 having a central integral bushing 28 (FIG. 5) through which a drive spindle 29 (part of the drive mechanism hereinbefore referred to) projects into the cassette from the floor of housing E. A winding arbor 30 is coupled to spindle 29 so as to be driven thereby in the direction indicated by arrow 31 in FIG. 4b.

Arbor 30 has sprocket teeth 43, preferably of saw tooth form to facilitate entry into sprocket apertures 44 in film B.

Cassette casing wall 26 has a door 32 which is adapted to register with gate door 24 when the gate 20 is rotated as indicated by arrow 33 of FIG. 4a, from a closed position shown in FIG. 4b, to the open position shown in FIG. 4a. Cassette casing bottom 27 has suitable means, e.g. a noncircular recess 35 in its underside adapted to receive a holding block 36 fixed to the floor of housing E, for fixing the cassette casing against rotation when it is inserted into the housing E, in a position bottoming against the housing floor. (FIG. 5 shows the cassette lifted above the bottoming position). Suitable means such as a stop pin 37 in lateral wall 26 projecting into an arcuate slot 38 of limited length in gate skirt 23, is operable to limit the rotary shifting of the gate 20 to the amplitude necessary for shifting between the open and closed positions. This pin and slot connection may also be employed to hold the sections of the cassette loosely together at all times in the telescoping coupled relation shown in FIG. 5, preventing relative axial movement, but additional means such as integral hooks 39 on the peripheral lip 25 of gate section 20, engageable around integral lugs 40 on lateral casing wall 26, with a camming, screw-type engagement, is preferably utilized to lock the gate section 20 to lateral casing wall 26 in a manner to tightly close the cassette against any possible light seepage when the cassette is closed by rotation of gate section 20 as indicated by arrow 41 of FIG. 4b.

In placing the cassette in the camera, the casing door 32 is located in a position facing the severing knife F. An exact angular orientation of the cassette casing is provided for, as by the coupling of the casing bottom recess 35 over the fixed floor block 36, and if desired, a supplementary, foolproof locating means such as to prevent location of the cassette casing in any position except the one in which its door is in opposed relation to knife F, may be utilized. Such a means may include an index lug or pin 42 as suggested in phantom in FIG. 5, but its details are unimportant in the present invention.

The Film—Guide Means of the Invention

The invention provides a guide 45 (FIG. 6) of resilient sheet material such as spring metal, embodying a spring shank 46 secured at its end, as by rivets 47, to gate skirt 23 and extending circumferentially therealong to window 24, a pair of spring fingers 48 projecting circumferentially and diagonally outwardly at an obtuse angle, through integral bends 58, around the nearer edge of door 24, from marginal areas of the free end of shank 46, and a pair of spring arms 49, doubled back at 501 upon the fingers 48 and extending spirally into the cassette to a position of tangency with the periphery of winding arbor 30. Arms 49 are joined by a spacer bridge 51 at their inner ends. Arms 49 are spaced so as to engage the marginal areas of film B outside the image-bearing area and outwardly of sprocket apertures 44 so as to avoid abrading the latent image and to avoid contact with sprocket teeth 43. The doubled outer extremities 501 of fingers 48 provide rounded bearing surfaces which slide against the inner surface of gate skirt 23 when the cassette is being closed and opened. Near the end of the opening movement, the fingers 48 extend outwardly through casing door 32 (FIG. 4a) so as to project beyond the outer surface of casing wall 26 and guide the free end of the film through doors 32, 24 into the cassette. Spring loading of shank 46 against the inner surface of gate skirt 23 is effective to project fingers 48 outwardly as soon as they reach the door 32 during opening movement of gate 20. Upon closing of the cassette, the fingers 48 will be cammed inwardly as they are pulled across the edge of door 32, and the arms 46 will flex inwardly in response to such inward camming.

The spacing between guide arms 49 and gathering fingers 48 is such that the image-bearing area of the film between its marginal areas, does not drag against these guide members. The spacer bridge 51 is disposed (by means of double-back end portions 50 of arms 49) in a position spaced radially outwardly from the surface of the body of film wound upon the arbor. As the diameter of this wound up body of film is increased by additional winding, the arms 49 are flexed outwardly, their inner ends riding upon the marginal areas of the wound body.

FIG. 8 discloses a modified form of the guide wherein the shank 46A is struck from the central area of a strip of resilient sheet material, being joined thereto by a bend 58A. A gathering finger 48A projects from bend 58A at an obtuse angle, for extension through the cassette, and a pair of guide arms 49A extend in the opposite direction from bend 58A, as extensions of and in alignment with marginal areas of finger 48A which are preferably raised above a central web portion of finger 48A by forming the latter into a shallow depressed channel. Arms 49A are provided with an inwardly spiraling configuration and terminate in raised marginal portions of a solid, bridging end portion (beyond the inner end of the aperture from which shank 46A is struck) such end portion including a bridge 51A of shallow channel section, depressed radially outwardly from the raised marginal portions which are formed as continuations of the arms 49A along their spiral path, and which bear against the marginal areas of the film wound upon arbor 30, the bridge 51A being thereby spaced away from and out of contact with the image-bearing body of the film. As in the arrangement shown in FIGS. 4a and 4b, the shank 46a is attached to the inner surface of skirt 23 back from the door 24, the bend 58a is registered with the nearer margin of door 24, and the gathering finger 48a bears against the inner surface of casing wall 26 when the cassette is opened.

Normally the free end of film B will enter the cassette in a path between the arbor 30 and the guide 45, so as to contact the guide 45 and be guided inwardly to the arbor. In order to assist in guiding the film in this path, the invention provides an arcuate spring tongue 53 having a shank 54 secured to the casing bottom 27, and a free end portion comprising a ramp 55 having an arcuate, concave inner margin hooked around the periphery of arbor 30, and a level tip 56 which has an end edge 57 of convex curvature, extending diagonally across the space between the skirt 23 and the arbor, substantially tangent to the arbor periphery on its receding side, and functioning as a barrier, normally raised above the casing bottom 27, blocking entry of the free end of the film into the space between the skirt 23 and the approaching side of the arbor periphery (the wrong side). The diagonally extending barrier edge 57 also functions as a deflector for leading the free end of the film toward the guide arms 49, as indicated by the broken arrow in FIG. 4a.

As the film is wound on arbor 30 to increasing depth, the lower edge of the wound film will ride on ramp 53 and press the tongue 53 downwardly to a flattened position beneath the film edge. Should the film enter the cassette in a radial path toward the center of the arbor 30 and pass between the arbor and ramp 53 so as to become hooked onto the sprocket teeth 43 before contacting guide 45, the tension in the film as it is drawn taut will flatten the tongue 51 downwardly beneath the lower edge of the film. In order that the tongue may function in this manner, it is made of thin, highly flexible spring sheet material.

We claim:
1. A self-threading film cassette comprising:
   a fixed casing section having a peripheral wall provided with a door;
   a gate section including a cylindrical skirt rotatably coupled to said fixed casing section and having a door adapted to register with said casing door;
   a winding arbor in the center of said casing section;
   a guide of resilient sheet material in said cassette, including a shank attached interiorly to said skirt and projecting circumferentially to the nearer margin of the door thereof, and a pair of spaced arms projecting from the end of said shank adjacent said margin, spirally inwardly to the periphery of said arbor in the direction of film winding, and engageable with marginal areas of a free end of film for guiding it into the cassette into engagement with the arbor; and
   a gathering finger projecting from the end of said shank diagonally outwardly into said skirt window and bearing against the inner surface of said casing wall when the cassette is closed, said finger being projected outwardly through said casing window and beyond said peripheral wall when said doors are in open registration with one another.

2. A cassette as defined in claim 1, wherein there are two of said fingers in spaced relation and said arms are doubled back from the ends of said fingers and integral therewith.

3. A cassette as defined in claim 1 said finger being of channel section, including a bridging web portion and marginal portions.

4. A cassette as defined in claim 1 said finger being in the form of an end portion of said guide integrally joined to and bridging between the outer ends of said arms.

5. A cassette as defined in claim 1, said finger being integrally joined to and bridging between the outer ends of said arms, and of channel section including a web and marginal portions providing bearing surfaces raised above said web and engageable with marginal portions of said film, with said web out of contact with the film.

6. A self-threading film cassette comprising:
   a fixed casing section having a peripheral wall provided with a door;
   a gate section including a cylindrical skirt rotatably coupled to said fixed casing section and having a door adapted to register with said casing door;
   a winding arbor in the center of said casing section;
   a guide of resilient sheet material in said cassette, including a shank attached interiorly to said skirt and projecting circumferentially to the nearer margin of the door thereof, and a pair of spaced arms projecting from the end of said shank adjacent said margin, spirally inwardly to the periphery of said arbor in the direction of film winding, and engageable with marginal areas of a free end of film for guiding it into the cassette into engagement with the arbor; and
   an integral spacer bridge joining the inner ends of said arms and disposed radially outwardly of said inner ends, out of contact with the body of film wound upon said arbor.

7. A cassette as defined in claim 6, said inner ends of the arms being doubled back upon inner extremities of said arms which bear against said wound body of film.

8. A cassette as defined in claim 6, said bridge being embodied in a web of shallow channel section formed radially outwardly from said end portions of the arms.

9. A self-threading film cassette comprising:
   a fixed casing section having a peripheral wall provided with a door;
   a gate section including a cylindrical skirt rotatably coupled to said fixed casing section and having a door adapted to register with said casing door;
   a winding arbor in the center of said casing section;
   a guide for directing a free end of film coming from a feeding device, inwardly from said door to the periphery of said arbor for attachment thereto; and
   a barrier tongue of spring sheet material having one end thereof secured to the bottom of said casing and a free end portion projecting arcuately around said arbor from said secured end in the direction of rotation of the arbor, said free end portion including a ramp rising above the casing bottom and adapted to be flattened downwardly beneath the lower edge of the film wound upon said arbor as the diameter of the wound portion increases, said ramp terminating in a raised end functioning as a barrier to movement of the entering free end of film past the approaching side of the arbor.

10. A cassette as defined in claim 9, wherein said free end of the tongue has an end edge with a convex curvature approximately tangent to the receding side of the arbor periphery, and terminating in an acute angle point.